(12) United States Patent
Dwyer (10) Patent No.: US 11,422,152 B2
(45) Date of Patent: Aug. 23, 2022

(54) STRESS RELIEVING SENSOR FLANGE

(71) Applicant: Honeywell International Inc., Morris Plains, NJ (US)

(72) Inventor: Paul W. Dwyer, Seattle, WA (US)

(73) Assignee: Honeywell International Inc., Charlotte, NC (US)

( * ) Notice: Subject to any disclaimer, the term of this patent is extended or adjusted under 35 U.S.C. 154(b) by 93 days.

(21) Appl. No.: 16/709,349

(22) Filed: Dec. 10, 2019

(65) Prior Publication Data

US 2021/0172974 A1 Jun. 10, 2021

(51) Int. Cl.
*G01P 15/13* (2006.01)
*B23K 26/21* (2014.01)
*G01P 1/02* (2006.01)
*G01P 15/125* (2006.01)

(52) U.S. Cl.
CPC ............ *G01P 15/132* (2013.01); *B23K 26/21* (2015.10); *G01P 1/023* (2013.01); *G01P 15/125* (2013.01)

(58) Field of Classification Search
CPC ..... G01P 15/023; G01P 15/125; G01P 15/132
See application file for complete search history.

(56) References Cited

U.S. PATENT DOCUMENTS

| | | | |
|---|---|---|---|
| 3,601,343 A | 8/1971 | Sivaslian | |
| 4,314,174 A | 2/1982 | Wing et al. | |
| 4,400,979 A | 8/1983 | Hanson et al. | |
| 4,697,455 A | 10/1987 | Norling | |
| 4,823,041 A | 4/1989 | Inoue et al. | |
| 5,097,172 A | 3/1992 | Becka | |
| 5,212,984 A | 5/1993 | Norling et al. | |
| 6,800,987 B2 | 10/2004 | Toda | |
| 7,013,730 B2 | 3/2006 | Malametz | |
| 7,194,903 B2 | 3/2007 | Dwyer | |
| 7,926,348 B2 | 4/2011 | Dwyer | |
| 10,214,414 B2 | 2/2019 | Boysel et al. | |
| 2019/0234781 A1* | 8/2019 | Mess | G01F 1/662 |

FOREIGN PATENT DOCUMENTS

CN 106226555 12/2016

OTHER PUBLICATIONS

"GJN-06A Quartz Flexible Accelerometer," ASIT, accessed on Apr. 10, 2019, 4 pp.

* cited by examiner

*Primary Examiner* — Walter L Lindsay, Jr.
*Assistant Examiner* — Andrew V Do
(74) *Attorney, Agent, or Firm* — Shumaker & Sieffert, P.A.

(57) ABSTRACT

The disclosure describes a sensor that includes a transducer, a case, and a mounting flange. The transducer defines an input axis. The case is configured to house the transducer. The mounting flange is statically coupled to the case and flexibly coupled to the transducer. The mounting flange defines an opening and includes a plurality of flexure elements extending radially into the opening to contact the transducer. Each flexure element is configured to flex in a radial direction perpendicular to the input axis and remain fixed in an axial direction parallel to the input axis.

14 Claims, 4 Drawing Sheets

STRESS RELIEVING SENSOR FLANGE

TECHNICAL FIELD

The present disclosure relates to systems and techniques for relieving stress on transducers.

BACKGROUND

A sensor may include a transducer and a case that houses the transducer. The transducer may detect a directional stimulus along an input axis and translate that stimulus into a measurement signal. During operation, the transducer may experience stresses caused by mechanical distortion of the case or other structure to which the transducer is mounted, or by differential thermal expansion or contraction between the transducer and the case. For example, the transducer and the case may have different coefficients of thermal expansion (CTE) that result in different amounts of expansion in response to a temperature change. These different amounts of expansion may create stresses that warp measurement components within the transducer. To account for deviations in sensor output caused by these temperature-induced stresses, the sensor may have a bias temperature coefficient (BTC) and a bias thermal hysteresis (BTH) that quantify how much the sensor output may shift due to the change in temperature. However, high amplitude and variability of the BTC and BTH may reduce accuracy of the sensor output.

SUMMARY

Stress-relieving flanges described herein may be utilized as part of a sensor to improve accuracy of the sensor. A mounting flange is statically coupled to a case and flexibly coupled to a transducer through an opening in the mounting flange. The mounting flange includes a plurality of flexure elements extending radially into the opening to contact the transducer. The transducer is sensitive to movement along the input axis, but insensitive to movement in other directions. As such, each flexure element of the mounting flange is configured to flex in a radial direction perpendicular to the input axis of the transducer, but remain fixed in an axial direction parallel to the input axis. In response to a change in temperature, the mounting flange may radially absorb stresses caused by a CTE mismatch between the case and the transducer to securely position the transducer in the case while reducing or eliminating movement of the transducer along the input axis. In some examples, the mounting flange may be monolithic and directly mounted to mounting pads, thus reducing a number of interfaces between the transducer and the structure to which the sensor is mounted. In this way, sensors that incorporate stress-relieving flanges discussed herein may have increased accuracy.

In some examples, the disclosure describes a sensor that includes a transducer defining an input axis, a case configured to house the transducer, and a mounting flange statically coupled to the case and flexibly coupled to the transducer. The mounting flange defines an opening and includes a plurality of flexure elements extending radially into the opening to contact the transducer. Each flexure element is configured to flex in a radial direction perpendicular to the input axis and remain fixed in an axial direction parallel to the input axis.

In some examples, the disclosure describes a method that includes forming a mounting flange. The mounting flange defines an opening and includes a plurality of flexure elements extending radially into the opening. Each flexure element is configured to flex in a radial direction and remain fixed in an axial direction. The method includes positioning a transducer in the opening of the mounting flange to contact the plurality of flexure elements. As a result, the transducer defines an input axis that is perpendicular to the radial direction and parallel to the axial direction. The method includes coupling the transducer to the mounting flange to flexibly couple the mounting flange to the transducer.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1A:
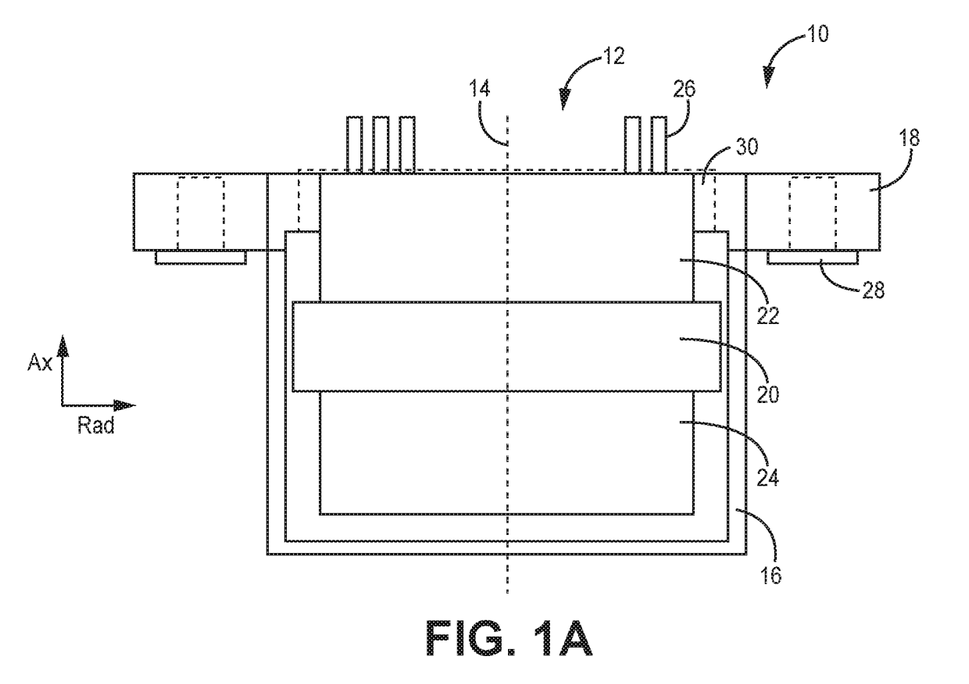
FIG. 1A is a side view diagram illustrating an example sensor that includes a stress-relieving flange.

Stress-relieving flanges described herein may be utilized as part of a sensor to improve accuracy of the sensor. FIG. 1A is a side view diagram illustrating an example sensor 10 that includes a stress-relieving mounting flange 18. Sensor 10 includes a transducer 12, a case 16, and mounting flange 18. Sensor 10 may be any sensor configured to detect a movement stimulus along an input axis 14 and generate a measurement signal corresponding to the detected movement stimulus or change in movement stimulus. Sensors that may be used for sensor 10 include, but are not limited to, accelerometers, displacement sensors, and the like.

Transducer 12 defines input axis 14. Transducer 12 is configured to detect a movement stimulus along input axis 14. In the example of FIG. 1A, transducer 12 is illustrated as a capacitive transducer that detects a change in capacitance in response to the movement stimulus, as will be described further below; however, transducer 12 may use one or more alternative or additional mechanisms to detect a movement stimulus along input axis 14. In the example of FIG. 1A, transducer 12 has a generally cylindrical shape; however, in other examples, other shapes may be used.

Transducer 12 includes a proof mass assembly (interior to the illustration), an upper stator 22, a lower stator 24, and one or more electrical pins 26. The proof mass assembly is disposed between upper stator 22 and lower stator 24. Upper stator 22 and lower stator 24 may each include an excitation ring, a permanent magnet, and a pole piece. Each excitation ring may include an inwardly facing surface that faces the proof mass assembly and interacts with (e.g., may be coupled to) portions of the proof mass assembly. Upper stator 22 and lower stator 24 are coupled by a bellyband 20.

Each excitation ring of transducer 12 may be made from a material having a relatively low coefficient of thermal expansion (CTE), such as invar, super invar, or the like. For example, invar may have a relatively low CTE of about 2 parts-per-million (ppm) per degree centigrade (° C.), which may improve compatibility aspects between upper and lower stators 22 and 24 and the base materials used to form the proof mass assembly (e.g., fused quartz which has a CTE of about 0.55 ppm/° C.). A CTE of upper stator 22 and/or lower stator 24 flexibly coupled to mounting flange 18 may be less than about 5 ppm/° C.

At least one of upper stator 22 or lower stator 24 may include electrical pins 26. For example, as illustrated in FIG. 1A, upper stator 22 includes electrical pins 26. Electrical pins 26 may be configured to couple to a controller (not shown) and may transmit electrical signals between the controller and upper stator 22, the proof mass assembly, lower stator 24, or any combination therein. While shown with five electrical pins 26, upper stator 22 may include additional or fewer electrical pins 26.

The proof mass assembly includes a proof mass that includes one or more capacitance pick-off plates mounted on an upper and/or lower surfaces of proof mass 22. A capacitor pick-off plate may be deposited on an upper surface of the proof mass assembly, and a similar capacitor pick-off plate may be deposited on a lower surface of the proof mass assembly. Each capacitance plate may be connected to other electronics of the proof mass assembly through one or more electrical traces. The capacitor plates cooperate with inwardly facing surfaces of upper stator 22 and lower stator 24 to provide the capacitive pick-off system. For example, as the proof mass assembly is displaced by a movement stimulus along input axis 14, such as acceleration, the change in capacitance of the capacitor plates on the top and bottom of the proof mass assembly can be used by sensor 10 to determine the displacement of the proof mass assembly. The amount of displacement of the proof mass assembly from a null position may be proportionate to the magnitude of the movement stimulus incident upon transducer 12.

In some examples, a force rebalance system may be used to detect the displacement of the proof mass assembly. In such examples, coil forms with force rebalance coils are mounted on either side of the proof mass assembly. The force rebalance coils cooperate with permanent magnets in upper stator 22 and lower stator 24 and with a suitable feedback circuit to retain the proof mass assembly at a predetermined position (i.e., a null position) with respect to a support structure. For example, the force from the movement stimulus will attempt to displace the proof mass assembly. The current in the force rebalance coils will be increased by a servo to maintain the null position of the proof mass assembly by driving the differential capacitance from the pick-offs to zero. The current increase in the force rebalance coils provides the opposite force required for maintaining the null position of the proof mass assembly, and the increase in current will be proportional to the applied movement stimulus.

In some examples, sensor 10 may be an accelerometer, such that transducer 12 is configured to detect the displacement of the proof mass assembly under inertial forces created by acceleration. Transducer 12 may be an accelerometer that is adapted to respond to accelerations along input axis 14 by producing an electrical signal that indicates the direction and magnitude of such acceleration. Transducer 12 may, for example, detect the displacement of the proof mass assembly by a capacitive pick-off system, as explained above. Acceleration applied to transducer 12 may be determined based on the change in capacitance with respect to the capacitor pick-off plates or the current increase in the force rebalance coils to maintain the proof mass in the null position.

In some examples, sensor 10 may include the controller (not shown), such as may be located physically above transducer 12. The controller may include any of a wide range of devices, including control circuitry, processors (e.g., one or more microprocessors, one or more application specific integrated circuits (ASICs), one or more field programmable gate arrays (FPGAs), or the like), processing circuitry, one or more servers, one or more desktop computers, one or more notebook (i.e., laptop) computers, one or more cloud computing clusters, or the like. The functions attributed to the controllers and processors described herein may be provided by a hardware device and embodied as software, firmware, hardware, or any combination thereof. In some examples, the controller may include through-holes that receive electrical pins 26 of upper stator 22 such that the controller may transmit electrical signals to, and receive electrical signals from, upper stator 22, the proof mass assembly, lower stator 24, or any combination therein.

In some examples in which transducer 12 includes a force rebalance system, the controller may be configured to maintain the proof mass of the proof mass assembly at the null position when the accelerometer experiences a movement stimulus, such as acceleration. For example, the force from movement stimulus will attempt to displace the proof mass. The controller may distribute current to force rebalance coils of the proof mass assembly such that the force rebalance coils may interact with a permanent magnet of upper stator 22 and a permanent magnet of lower stator 24 to provide the opposite force required for maintaining the null position of the proof mass. By causing the proof mass of the proof mass assembly to return to the null position, the controller may drive the differential capacitance from the pick-offs to zero.

Case 16 is configured to house transducer 12. In the example of FIG. 1A, case 16 is generally cylindrical and includes a cylindrical sidewall and a base; however, case 16 may have other shapes. Case 16 may be sized to permit a space between the cylindrical sidewall of case 16 and an outer surface of transducer 12. This space may prevent contact between transducer 12 and internal surfaces of case 16, thereby reducing or preventing stresses that may otherwise arise from this contact. The space may be filled with an inert gas. Case 16 may be manufactured from a variety of materials selected for factors such as weight, strength, and the like. A variety of materials may be used for case 16 including, but not limited to, aluminum, 304 stainless steel, and the like.

Transducer 12 and case 16 may have different coefficients of thermal expansion (CTE). In some instances, it may not be practical to match the CTE of mounting flange 18 to the CTE of case 16. For example, materials of upper and lower stators 22 and 24 may be selected for magnetic and/or thermal properties, and may have relatively low CTEs, which may improve thermal compatibility between upper and lower stators 22 and 24 and the base materials used to form the proof mass assembly. In contrast, materials of case 16 may be selected for structural properties, such as strength and weight, and may have a relatively high CTE compared to the materials used in transducer 12, such as materials of upper and lower stators 22 and 24. In some examples, a difference between a coefficient of thermal expansion of upper stator 22 or lower stator 24 flexibly coupled to mounting flange 18 and a coefficient of thermal expansion of case 16 may be greater than about 5 ppm/° C. For example, upper and lower stators 22 and 24 may be formed from invar, which may have a CTE of about 2 ppm/° C., while case 16 may be formed from 304 stainless steel, which may have a CTE of about 17 ppm/° C.

Sensor 10 may be used in an environment that is subject to changes in temperature. Transducer 12 and cast 16 may have different CTEs, such that a change in temperature may create stresses between transducer 12 and case 16. To reduce stresses that may be created by the different CTEs of transducer 12 and case 16, sensor 10 is configured to couple transducer 12 to case 16 using mounting flange 18. As described below, mounting flange 18 provides precise and stable alignment of transducer 12, such that transducer 12 is rigid against axial translation or rotation of transducer 12 with respect to case 16 parallel to or around input axis 14, and therefore not free to undergo translational or rotational movement with respect to case 16. However, mounting flange 18 may be flexible to differential volumetric expansion of transducer 12 in a radial direction perpendicular to input axis 14, thereby permitting differential radial or volumetric thermal expansion or contraction between transducer 12 and case 16 and isolates transducer 12 from stresses that would otherwise result from distortion of case 16, such as by positioning mounting flange 18 on a surface that is not perfectly flat or by differential thermal expansion between mounting flange 18 and its support. In this way, mounting flange 18 may provide precise and stable alignment of transducer 12.

Mounting flange 18 may be statically coupled to case 16. For example, mounting flange 18 may be statically coupled to case 16 such that forces experienced within ordinary operation of sensor 10 do not cause mounting flange 18 to substantially move relative to case 16. In some examples, mounting flange may be statically coupled to case 16 by adhesion or welding. In some examples, mounting flange 18 may be welded to case 16 via a weld joint. For example, a weld joint may have a bead formation acquired from welding flange 18 to case 16. Alternatively, flange 18 may be statically coupled to case 16 by a brazing process. In other examples, mounting flange 18 may be integral with case 16, such that mounting flange 18 and case 16 may be a monolithic unit. For example, mounting flange 18 and case 16 may be manufactured by an additive manufacturing process.

Mounting flange 18 may be flexibly coupled to transducer 12. For example, mounting flange 18 may be flexibly coupled to transducer 12 such that forces experienced within ordinary operation of sensor 10 may cause transducer 12 to move relative to mounting flange 18 while remaining attached to mounting flange 18. In some examples, mounting flange 18 suspends and/or holds transducer 12, such that transducer 12 is not free to undergo axial movement along input axis 14 with respect to case 16. Mounting flange 18 may restrain or isolate transducer 12 from contacting a side wall or base of case 16 by interposing the space between a perimeter of transducer 12 and the internal walls of case 16. This space may isolate transducer 12 from stresses that would otherwise result from distortion of case 16 whenever case 16 is not mounted on a flat surface or is exposed to deferential thermal expansion forces or temperatures.

A variety of materials may be used to form mounting flange 18 including, but not limited to, metals, alloys, polymers, and the like. In some examples, a material of mounting flange 18 may be selected according to a desired CTE of mounting flange 18. For example, the material of mounting flange 18 may be between a CTE of transducer 12 and a CTE of case 16.

Mounting flange 18 may flexibly couple to transducer 12 at a variety of locations. In the example of FIG. 1A in which transducer 12 includes upper stator 22 and lower stator 24, mounting flange 18 may be configured to flexibly couple to at least one of upper stator 22 or lower stator 24.

Figure 1B:
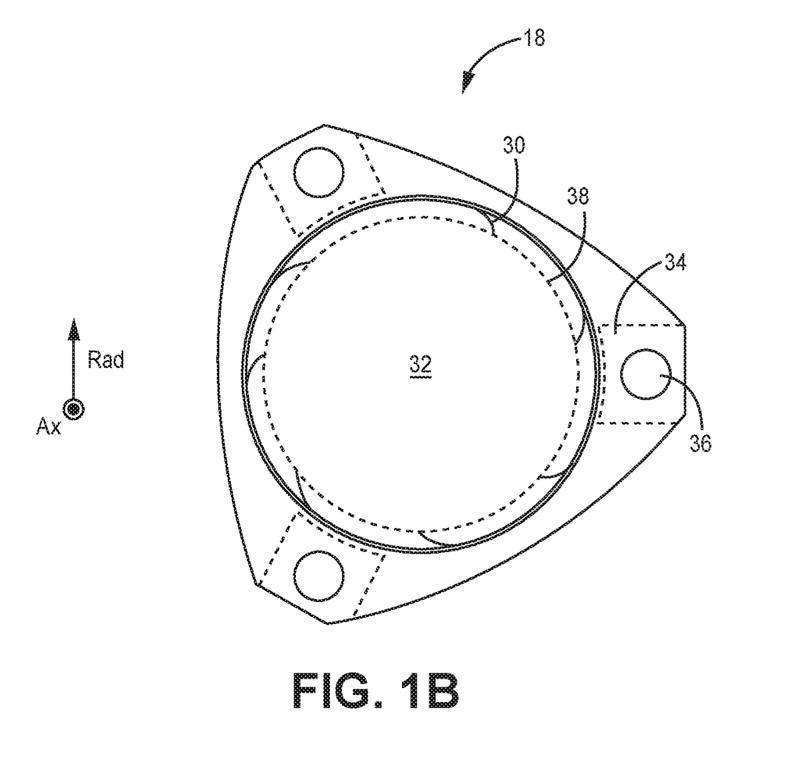
FIG. 1B is a top view diagram illustrating an example sensor that includes a stress-relieving flange.

FIG. 1B is a top view diagram illustrating example sensor 10 that includes stress-relieving mounting flange 18. Mounting flange 18 defines an opening 32. Opening 32 may be configured to permit positioning of transducer 12 within case 16. A diameter of opening 32 may be greater than a diameter of transducer 12 over a range of operating temperatures, such that a space between transducer and case 16 may be maintained during ordinary operation. In some examples, opening 32 may be sized to accommodate case 16.

Mounting flange 18 may be flexibly coupled to transducer 12 through a plurality of flexure elements 30. The plurality of flexure elements 30 extends radially into opening 32 to contact transducer 12 (indicated by dashed line 38). The plurality of flexure elements 30 is configured to maintain an axial position of transducer 12. For example, the plurality of flexure elements 30, as a combination, may be configured to accommodate volumetric expansion and/or axial distortion of transducer 12 in a manner reduces axial translation and, optionally, rotation of transducer 12.

Each flexure element 30 may be configured to flex in a radial direction (Rad) perpendicular to input axis 14 and remain fixed in an axial direction (Ax) parallel to input axis 14. Each flexure element 30 may be configured to provide a low resistance to relative movement between transducer 12 and case 16 in a radial direction perpendicular to input axis 14, and a high resistance to relative movement between transducer 12 and case 16 in directions normal (e.g., parallel or around input axis 14) to the radial direction. Differential thermal expansion between transducer 12 and case 16 may apply reduced stress to transducer 12 and/or cause reduced misalignment between transducer 12 and case 16 compared to sensors that do not include mounting flange 18.

In some examples, each flexure element 30 may be configured to further flex in a circumferential direction around input axis 14. For example, transducer 12 may only be sensitive to a movement stimulus along input axis 14. As such, the plurality of flexure elements 30 may be configured to translate a radial force in the radial direction perpendicular to input axis 14.

The plurality of flexure elements 30 may include any number of flexure elements 30. In the example of FIG. 1B, the plurality of flexure elements 30 includes seven flexure elements, while in the example of FIG. 1C described below the plurality of flexure elements 30 includes 12 flexure elements; however, other examples, may include other numbers of flexure elements. In some examples, the plurality of flexure elements 30 comprises at least three flexure elements 30. In some examples, the plurality of flexure elements comprises between about five and about fifty flexure elements. A number of flexure elements may be related to an average of a strain applied to sensor 10 through the plurality of flexure elements 30 around a periphery of transducer 12, such that a greater number of flexure elements 30 may decrease a strain on transducer 12. In some examples, a number of the plurality of flexure elements 30 may be related to manufacturing considerations, such as a practicality of producing very thin flexure elements 30, an amount of variation between the plurality of flexure elements 30, and a net reduction in strain achieved with a configuration of the plurality of flexure elements 30.

While flange 18 has been discussed with respect to reducing a net strain on transducer 12, such as through a symmetrical strain, in some instances, flange 18 may be configured to produce an asymmetrical strain. For example, other expansive or contractive effects in transducer 12 may be related to a temperature, along with a related strain produced by these effects. To reduce a net strain on transducer 12, the plurality of flexure elements 30 may be configured to produce an asymmetrical strain applied to transducer 12 to improve net performance by compensating for other effects within transducer 12. For example, the plurality of flexure elements may be configured with varying amounts of flexure depending on a radial position of a respective flexure element 30.

In some examples, mounting flange 18 may be a monolithic unit. For example, the plurality of flexure elements 30 may be integral with a remainder of mounting flange 18. Such a monolithic design may reduce a number of interfaces between transducer 12 and a mounting structure upon with mounting flange 18 is mounted, which may reduce an amount of misalignment in response to a particular amount of stress compared to mounting flanges that are not monolithic. As will be described further in FIG. 2 below, a mounting flange 18 manufactured or assembled as a monolithic unit may be easier to produce using less or simpler tooling with higher consistency.

Mounting flange 18 may include mounting pads 34. Mounting pads 34 may be configured to contact a supporting structure (not shown). Each mounting pad 34 includes a mounting hole 36 configured to mount to the supporting structure (not shown). For example, mounting bolt 28 may be positioned in mounting hole 36 of a plurality of mounting holes and secured to the supporting structure, such that mounting pads 34 rest on the support structure. Mounting pads 34 may be mounted to an airframe or other supporting structure with bolts into threaded mounting holes 36. An airframe may be made from aluminum having CTE of 24 ppm/° C., in contrast to transducer 12, which may be made from 304 stainless steel having a CTE of 17 ppm/° C.

Figure 1C:
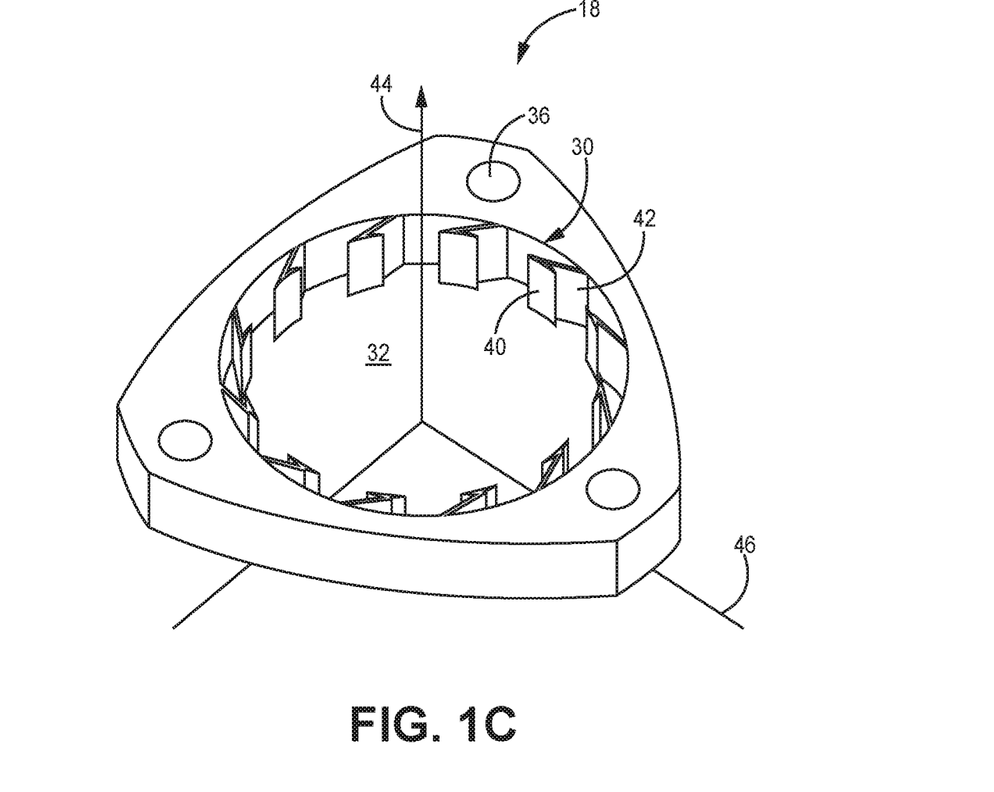
FIG. 1C is a perspective view diagram illustrating an example stress-relieving flange.

FIG. 1C is a perspective view diagram illustrating an example stress-relieving flange with respect to an axial direction 44 and a radial direction 46. In the example of FIG. 1C, each flexure element 30 includes a discrete radial pad 40 contacting transducer 12 (not shown). Each pad 40 includes an inwardly facing surface. This surface may have a cylindrical contour that matches a contour of the adjacent outer surface of transducer 12. Pads 40 form a segmented ring having a cylindrical inner surface for contacting transducer 12 and expanding in response to volumetric expansion of transducer 12.

Figure 1D:
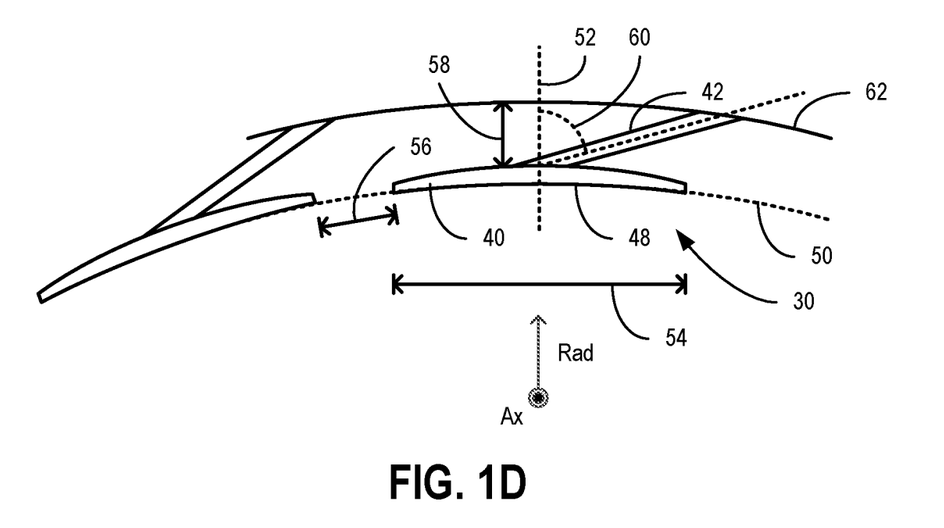
FIG. 1D is a top view diagram illustrating an example flexure of a stress-relieving flange.

FIG. 1D is a top view diagram illustrating an example flexure element 30 of stress-relieving flange 18. Pad 40 includes inwardly facing inner surface 48. A shape of inner surface 48 may be configured to match a circumference 50 of transducer 12. For example, a radius of inner surface 48 surface may be dimensioned to match a radius of the adjacent outer surface of transducer 12.

In some examples, pad 40 may be joined to transducer 12 by an adhesive layer (not shown). A suitable material for the adhesive layer may be a structural adhesive such as an epoxy resin. In some examples, the adhesive layer is selected according to CTE. For example, the adhesive layer may have a CTE between a CTE of mounting flange 18 and a CTE of upper stator 22 and/or lower stator 24. In some examples, mounting flange 18 may be joined or bonded to transducer 12 by a process, such as welding or brazing, that produces a rigid and integral bond between mounting flange 18 and transducer 12. In some examples, pad 40 includes a preform configured to couple pad 40 to transducer 12 and electrically isolate transducer 12 from mounting flange 18. For example, the preform may be an adhesive or other insulative material, such that electrical current from transducer 12 is discharged through electrical pins, such as illustrated in FIG. 1A.

Each beam 42 may be configured to have a compliant axis 52 oriented in the radial direction (Rad). Compliant axis 52 may represent a general path of displacement of pad 40 for at least a range of displacement encountered during normal operation of transducer 12. For example, a path of displacement of pad 40 may have an arc or other non-linear path due to radial asymmetry around input axis 14, such that compliant axis 52 may be a linear approximation of this non-linear path. Compliant axis 52 of each beam 42 may intersect an axial centerline of transducer 12, such as near input axis 14. Beam 42 may be configured to be rigid in an axial directions (Ax). Differential radial or volumetric thermal expansion (or contraction) between transducer 12, mounting flange 18, and case 16 therefore results in differential movement between transducer 12 and case 16 along compliant axis 52 of each beam. Beam 42 is configured to flex to take up the differential movement of pad 40 along compliant axis 52 without transmitting significant stress to the transducer 12. However, the rigidity of each beam 42 in a direction perpendicular to a respective compliant axis 52, may result in a mounting system in which transducer 12 is not free to rotate or to undergo axial translational movement with respect to case 16. For example, each flexure element 30 may be relatively insensitive to rotational movement, as flexure element 30 may be stiff in the hinge direction such that only asymmetry in flexure element 30 (e.g., non-linear path of displacement) may cause the proof mass to deviate from the servo plane under rotation. In the case of an accelerometer transducer 12, input axis 14 may be preferably aligned with or in a stiffest or most rigid axis of beams 42 (i.e., beams in direct compression). This may reduce frequency response errors and phase shift error due to suspension system mechanical transmissibility (e.g., due to flex of the plurality of flexure elements 30).

The plurality of flexure elements 30, individually or as a collection, may be designed for a variety of factors including, but not limited to, net radial stiffness (e.g., stiffness along compliant axis 52), matching curvature of pad 40 with a curvature of an outer surface of transducer 12, and tooling considerations for manufacturing the plurality of flexure elements 30, such as an ability to expand an inner diameter formed by the plurality of flexure elements 30 to accommodate insertion of transducer 12 or having tapered flexure elements 30 for self-assembly.

Each beam 42 may be oriented an angle 60 from compliant axis 52 (e.g., along an axis between a center of pad 40 and an attachment point at an inner wall 62 of mounting flange 18). Angle 60 may be selected to provide a particular degree of flex to flexure element 30. In some examples, angle 60 is between about 70 degrees and about 90 degrees when mounting flange 18 is not at flexure (e.g., has not received transducer 12). Each pad 40 is a depth 58 from inner wall 62 of mounting flange 18. Depth 58 may be selected on an anticipated degree of expansion in a radial direction (Rad). For example, beam 42 may be configured to force the strains applied to the system by temperature changes to be taken up by beam 42 flexing along compliant axis 52 while maintaining good sensor orientation along input axis 14, while at a same time maintain an original stress/strain state of sensor 10. In some examples, depth 58 may be between about 1 millimeter and about 10 millimeters when mounting flange 18 is not at flexure.

Each pad 40 has a width 54. Width 54 may be selected based on a desired surface area of each 40, a total surface area of the plurality of pads 40, a number of the plurality of pads 40, an anticipated degree of contraction, and the like. Width 54 may be selected (with respect to a circumference of mounting flange 18) such that each beam 42 may be essentially planar and compliant in a radial direction (Rad). In some examples, width 54 may be between about 1 millimeter and about 10 millimeters. Pads 40 of the plurality of flexure elements 30 are spaced apart by gaps 56 that may reduce a hoop stress that may otherwise occur due to differential thermal expansion or contraction between mounting flange 18 and case 16. Gaps 56 permit the plurality of flexure elements 30 to expand to form opening 32 having a variety of different circumferences in response to a force. The distance between adjacent mounting elements (i.e., the width of gaps 56) may be sufficiently large to avoid interference between beams 42 due to thermal expansion or seismic inputs. In some examples, gap 56 may be between about 1 millimeter and about 10 millimeters when mounting flange 18 is not at flexure. The distances that pad 40 and inner surface 62 of mounting flange 18 extend from the plane of beam 42 should be sufficiently large to avoid interference between each beam 42, transducer 12, and case 16.

While not illustrated in FIG. 1D, each pad 40 has a height. The height of each pad 40 of the plurality of flexure elements 30 may be selected to stiffen pad 40 along input axis 14 to minimize deleterious effects on axis alignment (e.g., the alignment of input axis 14 to a vertical axis of transducer 12.)

Figure 2:
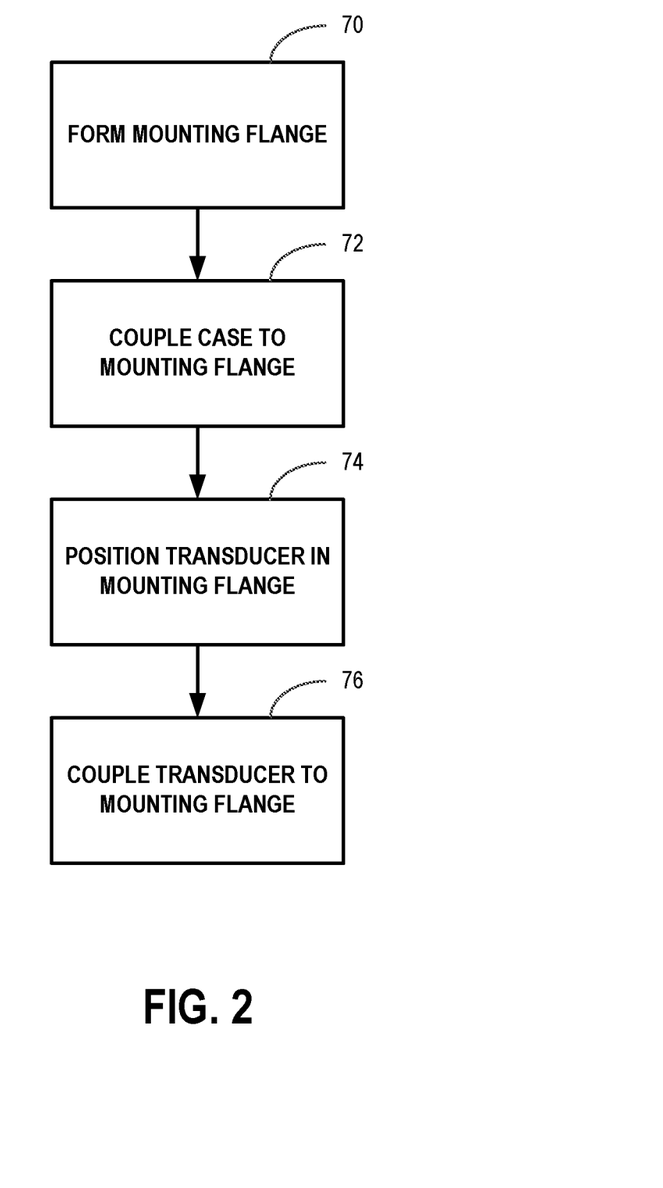
FIG. 2 is a flow chart of an example method for assembling a transducer that includes a stress-relieving flange.

FIG. 2 is a flow chart of an example method for manufacturing a sensor. The example technique of FIG. 2 will be described with reference to FIGS. 1A-1C; however, the examples technique of FIG. 2 may be used to manufacture other sensors.

The technique of FIG. 2 includes forming mounting flange 18 (70). A variety of techniques may be used to form mounting flange 18 including, but not limited to, casting, machining, additive manufacturing, and the like. In some examples, forming mounting flange 18 includes additively manufacturing mounting flange 18 to form a monolithic unit. Complex features, such as the plurality of flexure elements 30, may be difficult to precisely manufacture using casting or machining techniques. While complex features may be separately manufactured and assembled, such assembly may be difficult and expensive. By forming mounting flange 18 as a monolithic unit, mounting flange 18 may be manufactured less expensively and/or using less or simpler tooling with a high dimensional and/or compositional precision and/or higher part-to-part repeatability. In some examples, additively manufacturing mounting flange 18 includes three-dimensional (3D) printing mounting flange 18. In some examples, the technique of FIG. 2 includes additively manufacturing mounting flange 18 and case 16 to form a monolithic unit.

The technique of FIG. 2 includes coupling case 16 to mounting flange 18 to statically couple mounting flange 18 to case 16 (72). In some examples, coupling case 16 to mounting flange 18 may include laser welding case 16 to mounting flange 18. In some examples, the plurality of flexure elements 30 extends a depth into mounting flange 18 that is less than a depth of mounting flange 18. In such examples, the technique of FIG. 2 may further include positioning a top of case 16 within opening 32 of mounting flange 18 prior to coupling case 16 to mounting flange 18.

The technique of FIG. 2 includes positioning transducer 12 in opening 32 of mounting flange 18 to contact the plurality of flexure elements 30 (74). The plurality of flexure elements 30 extend radially into opening 32, such that each flexure element 30 is configured to flex in a radial direction and remain fixed in an axial direction. As a result, transducer 12 defines input axis 14 that is perpendicular to the radial direction of the plurality of flexure elements 30 and parallel to the axial direction.

The technique of FIG. 2 includes coupling transducer 12 to mounting flange 18 to flexibly couple mounting flange 18 to transducer 12 (76). In some examples, coupling mounting flange 18 to transducer 12 may include coupling pad 40 to transducer 12 by an adhesive layer (not shown). In some examples, mounting flange 18 may be joined or bonded to transducer 12 by a process, such as welding or brazing, that produces a rigid and integral bond between mounting flange 18 and transducer 12.

Various examples have been described. These and other examples are within the scope of the following claims.

What is claimed is:

1. A sensor comprising:
   a transducer defining an input axis, wherein the transducer comprises an upper stator and a lower stator;
   a case configured to house the transducer; and
   a mounting flange statically coupled to the case and flexibly coupled to the transducer,
   wherein the mounting flange is configured to flexibly couple to at least one of the upper stator or the lower stator,
   wherein the mounting flange defines an opening and comprises a plurality of flexure elements extending radially into the opening to contact the transducer, each flexure element configured to flex in a radial direction perpendicular to the input axis and remain fixed in an axial direction parallel to the input axis, and
   wherein at least one of:
      a coefficient of thermal expansion of the upper stator or the lower stator flexibly coupled to the mounting flange is less than about 5 parts-per-million/° C., or
      a difference between the coefficient of thermal expansion of the upper stator or the lower stator flexibly coupled to the mounting flange and a coefficient of thermal expansion of the case is greater than about 5 parts-per-million/° C.

2. The sensor of claim 1, wherein each flexure element of the plurality of flexure elements comprises a discrete radial pad contacting the transducer.

3. The sensor of claim 2, wherein the discrete radial pad of each of the plurality of flexure elements includes a preform configured to couple the discrete radial pad to the transducer and electrically isolate the transducer from the mounting flange.

4. The sensor of claim 1, wherein the sensor is an accelerometer.

5. The sensor of claim 1, wherein the mounting flange is a monolithic unit.

6. The sensor of claim 1, wherein the coefficient of thermal expansion of the upper stator or the lower stator flexibly coupled to the mounting flange is less than about 5 parts-per-million/° C.

7. The sensor of claim 1, wherein the difference between the coefficient of thermal expansion of the upper stator or the lower stator flexibly coupled to the mounting flange and the coefficient of thermal expansion of the case is greater than about 5 parts-per-million/° C.

8. The sensor of claim 1, wherein each flexure element of the plurality of flexure elements is configured to further flex in a circumferential direction around the input axis.

9. The sensor of claim 1, wherein the plurality of flexure elements comprises at least three flexure elements.

10. The sensor of claim 1, wherein the mounting flange includes a plurality of mounting holes configured to mount to a support structure.

11. A method, comprising:

additively manufacturing a mounting flange to form a monolithic unit, wherein the mounting flange defines an opening and comprises a plurality of flexure elements extending radially into the opening, each flexure element configured to flex in a radial direction and remain fixed in an axial direction, wherein the plurality of flexure elements extends a depth into the mounting flange that is less than a depth of the mounting flange;

positioning a top of a case within the opening of the mounting flange, wherein the case is configured to house the transducer;

coupling the case to the mounting flange to statically couple the mounting flange to the case;

positioning a transducer in the opening of the mounting flange to contact the plurality of flexure elements, wherein the transducer defines an input axis that is perpendicular to the radial direction and parallel to the axial direction; and coupling the transducer to the mounting flange to flexibly couple the mounting flange to the transducer.

12. The method of claim 11, wherein coupling the case to the mounting flange comprises laser welding the case to the mounting flange.

13. The method of claim 11, wherein additively manufacturing the mounting flange comprises three-dimensional (3D) printing the mounting flange.

14. A sensor comprising:

a transducer defining an input axis;

a case configured to house the transducer; and a mounting flange statically coupled to a top of the case and flexibly coupled to a side of the transducer, wherein the mounting flange defines an opening and comprises a plurality of flexure elements extending radially into the opening to contact the transducer, each flexure element configured to flex in a radial direction perpendicular to the input axis and remain fixed in an axial direction parallel to the input axis, wherein the top of the case is positioned within the opening of the mounting flange, and wherein the plurality of flexure elements extends a depth into the mounting flange that is less than a depth of the mounting flange.

\* \* \* \* \*